US008913981B1

(12) United States Patent
Schumacher

(10) Patent No.: US 8,913,981 B1
(45) Date of Patent: Dec. 16, 2014

(54) IDENTIFICATION AND OPTIMIZATION OF MID CALL PUBLIC SAFETY ANSWERING PLATFORM NEXT GENERATION 911 MEDIA SUPPORT

(71) Applicant: Sprint Communications Company L.P., Overland Park, KS (US)

(72) Inventor: Gregory David Schumacher, Holliston, MA (US)

(73) Assignee: Sprint Communications Company L.P., Overland Park, KS (US)

( * ) Notice: Subject to any disclaimer, the term of this patent is extended or adjusted under 35 U.S.C. 154(b) by 89 days.

(21) Appl. No.: 13/829,100

(22) Filed: Mar. 14, 2013

(51) Int. Cl.
*H04M 11/04* (2006.01)
*H04W 4/22* (2009.01)

(52) U.S. Cl.
CPC .................................. *H04W 4/22* (2013.01)
USPC ............... 455/404.1; 455/423; 455/67.11; 379/45; 379/26.01

(58) Field of Classification Search
CPC ............................. H04W 76/007; H04W 4/22
USPC ............ 455/404.1, 423, 67.11; 379/45, 26.01
See application file for complete search history.

(56) References Cited

U.S. PATENT DOCUMENTS

2012/0302217 A1* 11/2012 Sennett et al. ............. 455/414.1

OTHER PUBLICATIONS

National Emergency Number Association (NENA) Technical Committee Chairs, NENA Detailed Functional and Interface Standards for the NENA i3 Solution (TSD), NENS 08-003 v1, Jun. 14, 2011.

Intrado Inc., "Articles", Available at: http://www.intrado.com/news/articles/, 2012.
Verint Systems Inc., "Product Portfolio—Impact 360 for Public Safety Powered by Audiolog: Multimedia recording, speach analytics, eLearning and coaching, performance scorecards, forecasting and scheduling, and citizen surveys", Available at: http:verint.com/public_safety/overview.cfm?article_level11_category_id=422, 2012.
Serge Panossian and Deep Medhi, "Towards Providing Enhanced 911 Emergency Service in IP Telephony", University of Missouri—Kansas City, Kansas City, MO, USA, Nov. 1998.
verticalnews.com, "Verizon and Intrado Join Forces to Deploy Next-Generation 911 Services Nationwide", Journal of Technology & Science, Mar. 6, 2011.
Todd Poremba, "Recommendations for Implementing NG9-1-1 Components", TeleCommunication Systems (TCS)—Enabling Convergent Technologies, Jun. 4, 2010.
Ashok Bindra, "Vermont Launches First Statewide Text-to-911 Trial for Emergency Help", Available at: http://www.tmcnet.com/channels/e911-hosted-solutions/articles/289353, May 8, 2012.
Monica Gleberman, "Virginia's Franklin County Upgrading to Next-Generation 911 System", Available at: http://www.tmcnet.com/channels/e911-hosted-solutions/articles/246832, Dec. 19, 2012.
Intrado Inc., "Public Safety—NG 9-1-1", Available at: http://www.intrado.com/solutions/PSAP, 2012.

* cited by examiner

Primary Examiner — Marcos Torres

(57) ABSTRACT

A method, system, and medium are provided for generating a profile for public safety answering platforms (PSAP). The profile identifies media formats supported by the PSAPs at various cell sector locations maintained by a network provider. A network server selects a cell sector and generates a first test emergency services call and subsequent test emergency services calls. The test emergency services call is transmitted to a PSAP. During the session with the PSAP, the subsequent test emergency services calls are processed to determine mid-call support for additional multimedia formats or codecs. The PSAP generates responses that indicate whether the PSAP supports a multimedia format or codec identified in the test emergency services call or the subsequent test emergency services call. The PSAP transmits the responses to the network server for storage in the profile.

20 Claims, 5 Drawing Sheets

IDENTIFICATION AND OPTIMIZATION OF MID CALL PUBLIC SAFETY ANSWERING PLATFORM NEXT GENERATION 911 MEDIA SUPPORT

SUMMARY

A high-level overview of various embodiments of the invention is provided here to recapitulate the described embodiments and to introduce a selection of concepts further explained below in the detailed description section. This summary is not intended to identify key features or essential features of the claimed subject matter, nor is it intended to be used as an aid in isolation to determine the scope of the claimed subject matter. In brief and at a high level, this disclosure describes, among other things, ways to generate a profile for a public safety answering platform (PSAP), where the profile identifies media formats supported by the PSAP during mid-call renegotiation. The identification of PSAP capabilities may be optimized based on previous PSAP responses stored in PSAP profiles. The optimized testing of the PSAPs reduces signaling for test emergency services calls.

The wireless network, in some embodiments, includes a network server that generates test emergency services calls. The test emergency services calls include a first test emergency services call and one or more mid-call services signals. The wireless network may include multiple cell sectors, which may be covered by multiple PSAPs. The network server generates the test emergency services calls for each sector to identify the PSAPs covering each sector and to identify the media support provided by the PSAPs. The media support identification may include whether the PSAP supports mid-call renegotiation of the media formats or codecs.

The network server may randomly select a cell sector maintained by the wireless network provider. In turn, the network server generates the test emergency services calls and transmits the test emergency services calls to a PSAP. The test calls, including the one or more mid-call services signals, may identify one or more media formats supported by the wireless network. The network server receives a response from the PSAP. The response may indicate whether the PSAP supports a media format identified in the test calls. In some embodiments, another PSAP response may indicate whether mid-call renegotiation of media formats or codecs identified in the one or more mid-call services signals is supported. The profile for the PSAP is created to store an identifier for the PSAP and the corresponding media formats supported by the PSAP. The profile may be stored in a database connected to the network server.

In other words, the PSAP may provide one or more responses having the supported media format and whether mid-call renegotiation to the media format or codec is permitted. In one embodiment, the PSAP obtains the test emergency services calls. The PSAP may extract media formats or codecs requested in the test emergency services call or one or more mid-call services signals and note any requested changes to a current session. The media format and codec capabilities are identified by the PSAP. If any of the current capabilities match the extracted media formats, the PSAP generates a response that includes the matching capabilities. The response may indicate that a requested change of media formats or media codecs is permitted. If a match is not found, the response indicates that the requested media formats or codec are not supported by the PSAP or not supported during a mid-call renegotiation. The PSAP transmits the one or more responses to the network server for storage in the profile corresponding to the PSAP.

BRIEF DESCRIPTION OF THE SEVERAL VIEWS OF THE DRAWINGS

Illustrative embodiments of the invention are described in detail below with reference to the attached drawing figures, and wherein.

DETAILED DESCRIPTION

Figure 1:
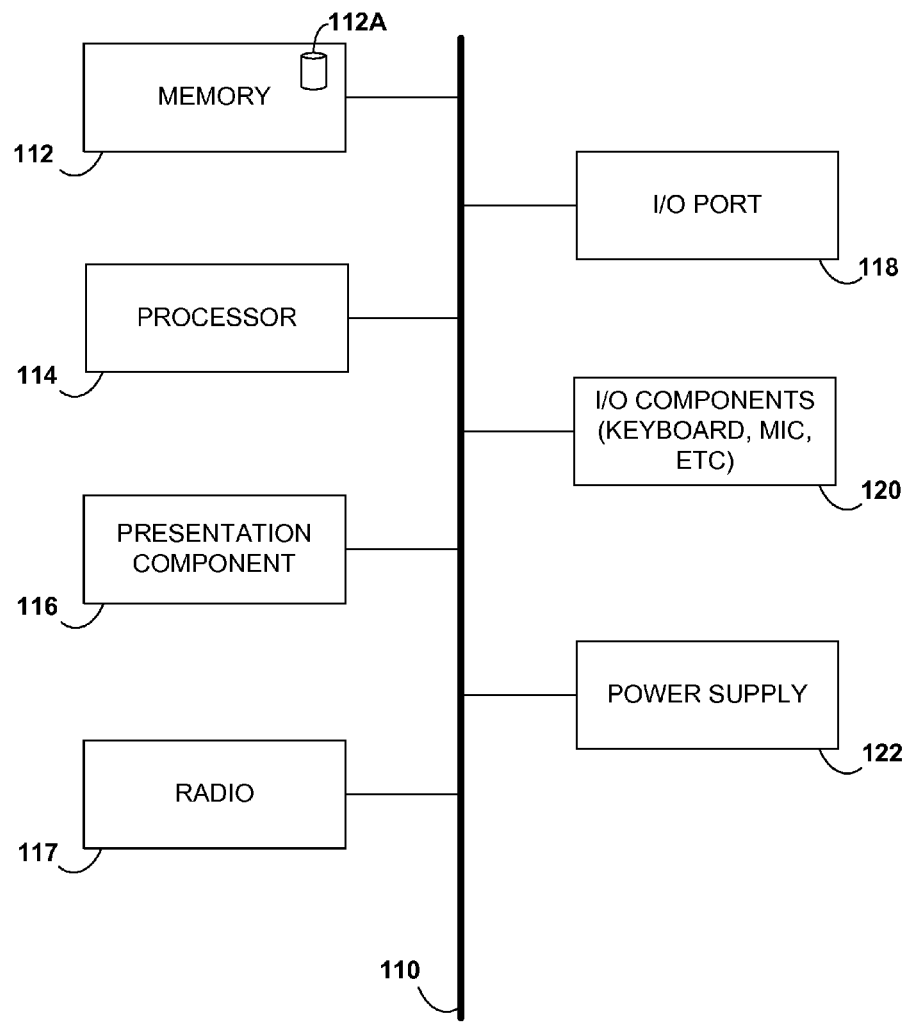
FIG. 1 depicts a block diagram of an exemplary network device in accordance with embodiments of the invention.

The subject matter of the patent is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Embodiments of the invention are directed to identifying media format support at PSAPs that cover cell sectors maintained by a wireless network provider. A network server is configured to build PSAP profiles based on the responses to test emergency services calls. The profile includes an indication of the services and media format that are supported by the PSAP. The PSAP profile may also indicate whether mid-call renegotiation of media formats or codecs are permitted for one or more of the formats or codecs.

The network server may execute an optimized method to identify PSAPs that provide multiple media support and mid-call media modifications, in certain embodiments. The network server may be configured to determine the mid-call media capabilities of each of the PSAPs. The optimizations performed by the network server may reduce the number of test mid-call services signals that are generated and transmitted to the PSAPs. The PSAP may support an optimum combination of media format renegotiation of the plausible media combinations. This allows the PSAP to efficiently use network signaling and call traffic. The profiles corresponding to the PSAP are updated to reflect the current capabilities of the PSAP. When the emergency services (NG911 services) of a PSAP allows renegotiation of media formats during a session without restarting or interrupting the session, the profile corresponding to the PSAP is updated to identify this capability of the PSAP.

In one embodiment, one or more mid-call services signals are transmitted to the PSAP to discover its mid-call media support and renegotiation capabilities. These mid-call capabilities are in addition to the media capabilities identified in response to the first test emergency services call. The one or more mid-call services signals may be transmitted during the first test emergency services call. The first test emergency services call may be configured as a SIP invite. On the other hand, the one or more mid-call services signals may be configured as a SIP reinvite. The network server may configure both the first test emergency services call and the one or more mid-call services signals.

The SIP protocol allows a network server to change, add, or delete media formats or codecs within an existing call session. Not all media formats, codecs, or PSAPs support changing or adding media format, types, or codecs during a call. The one or more mid-call services signals having the modified formats or codecs are transmitted to the PSAP during testing to determine whether mid-call capabilities of the PSAPS include media renegotiation. Some PSAPs may not support mid-call media modifications. For instance, the networks server, in at least one embodiment, periodically transmits test emergency services calls and one or more mid-call services signals to the loopback interface of the PSAP to query the capability of the PSAP. The network server receives the responses and stores the capability information in a database. The responses may indicate that the PSAP does not support a selected media format or mid-call renegotiation. In most cases, but not all, it is likely that the PSAP will support a particular type of media specified both at the start of the call and mid way through the call. This additional information about PSAP support can be used to either control selection of the partially supported media (e.g., do not use unsupported media at all) or lower the priority of using the unsupported media.

Accordingly, embodiments of this invention provide a means to automatically determine the media handling capabilities of each of the PSAPs. The PSAP responses indicate whether the PSAP is ready for next generation 911 services. In other words, when a wireless device transmits a Next Generation 911 emergency services call having a supported media format, the PSAP in the cell sector of the wireless device should respond without rejecting the Next Generation 911 emergency services call as unsupported. If an unsupported media format of the Next Generation 911 emergency services call is received by the PSAP, the media format may be converted if possible or the Next Generation 911 emergency services call may be rejected.

For instance, the network server may identify each of the media formats that are currently supported by the wireless network or the wireless devices connected to the wireless network. The media formats include, among others, voice, text, and video. In turn, the network server selects a cell sector out of all the network cell sectors and stores the cell sector identification in a database. The cell sectors may be selected randomly by the network server. In certain embodiments, the geographical location, e.g., latitude and longitude, of the selected cell sectors is also recorded in the database. The network server chooses one or more media formats to include in a test emergency services call. The media formats may be combined in the test emergency services call based on the network server selections. The media format selections that form the combinations may be random. In one embodiment, each cell sector is tested for all of the media formats and for each combination of media formats. In some embodiments, the test emergency services calls may be test Next Generation 911 calls. The network server may also generate one or more mid-call services signals that are transmitted to a PSAP that has established one or more sessions with the network server. The subsequent test emergency services calls are configured to determine the mid-call capabilities of the PSAP.

Responses to the test emergency services calls and one or more mid-call services signals are generated by the PSAP and returned to the network server. The responses may include an identifier for the PSAP that received the test emergency services calls and indications of whether the media formats requested in the test emergency services calls are supported by the PSAP. The responses may also indicate whether mid-call renegotiation of media formats, codecs, or types is permitted. In some embodiments, the response is an OK response. The OK response indicates that the PSAP supports the media format included in the test emergency services calls. The OK response, in some embodiments, may also indicate that the PSAP supports the media format included in the test emergency services calls and the one or more mid-call services signals. In other embodiments, the response may be an error message that indicates that the PSAP does not support the media format included in the test emergency services calls. The error message may also indicate that the PSAP does not support the mid-call media renegotiation of media formats or codecs included in the one or more mid-call services signals.

In an embodiment, the profile is updated with the cell sector, the PSAP identifier information, an indication of the media formats that are supported and media formats that are not supported by the identified PSAP, and an indication of mid-call capabilities of the PSAP. If the test emergency services call was processed by the PSAP and an OK response is generated, then the network server accesses the profile to identify the particular media format supported by the PSAP or to identify the mid-call media format or codec renegotiations supported by the PSAP. If the test emergency services calls are processed by the PSAP and an error response is generated, such as "415 Unsupported Media Type," then when the network server accesses the profile, the network server identifies the particular media formats not supported by the PSAP and identifies the mid-call media format or codec renegotiations not supported by the PSAP.

Throughout this patent, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the embodiments of the invention. The following is a list of these acronyms:

| | |
|---|---|
| BTS | Base Transceiver Station |
| CDMA | Code Division Multiple Access |
| CD-ROM | Compact Disc, Read Only Memory |
| DVD | Digital Versatile Disc |
| EEPROM | Electrically Erasable Programmable Read Only Memory |
| GPRS | General Packet Radio Services |
| GPS | Global Positioning System |
| GSM | Global System for Mobile communications (Groupe Spécial Mobile) |
| IP | Internet Protocol |
| IPv4 | Internet Protocol Version Four |
| IPv6 | Internet Protocol Version Six |
| LED | Light Emitting Diode |
| LTE | Long Term Evolution |
| NFC | Near-Field-Communication |
| PSAP | Public Safety Answering Platform |
| PTT | Push-To-Talk |

| | |
|---|---|
| RAM | Random Access Memory |
| ROM | Read Only Memory |
| RNC | Radio Network Controller |
| SDP | Session Description Protocol |
| SIP | Session Initiation Protocol |
| SMS | Short Message Services |
| TDMA | Time Division Multiple Access |
| UMTS | Universal Mobile Telecommunications System |
| USB | Universal Serial Bus |
| Wi-Fi | Wireless Fidelity |
| WiMAX | Worldwide Interoperability for Microwave Access |

Embodiments of the invention can take the form of a method, server, network device, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include communication media and computer storage media implemented in any method or technology that stores information. Examples of stored information include computer-useable instructions, data structures, program components, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

In one embodiment, the network server is configured with several input and output components. The network server may include applications for communicating with different networks. The applications may include an emergency services application. The emergency services application allows wireless devices to communicate with emergency services centers. In one embodiment, the applications include a test emergency services application, which allows the network server to test various media formats supported by the wireless network at multiple PSAPs. The test emergency services application may allow the network server to determine whether mid-call renegotiation is supported and the media formats or codecs that are implemented by the PSAP. The network server may utilize the input and output component of the network server to implement operations requested by the applications.

FIG. 1 depicts a block diagram of an exemplary network server in accordance with embodiments of the invention. Turning now to FIG. 1, a block diagram of an illustrative network server is provided and referenced generally by numeral 100. Although some components are shown in the singular, they may be plural. For example, network server 100 might include multiple processors or multiple radios, etc. A network server 100 may be one of many devices, including, but not limited to, a switch, a router, a mobility agent, or a bridge. As illustratively shown, network server 100 includes a bus 110 that directly or indirectly couples various components including memory 112, a processor 114, a presentation component 116, a radio 117, input/output ports 118, input/output components 120, and a power supply 122.

We have previously described various memory components that memory 112 might take the form of. Memory component 112 can include any type of medium that is capable of storing information (e.g., a database 112A). The database 112A may be configured to store network access credentials, including a network identifier, password, or key associated with the network server 100; location information based on GPS; and any information that the network server 100 transmits to the wireless network. The database 112A may also store applications like emergency services call applications and test emergency services call applications associated with the network server 100. The emergency services may include fire, police, or medical services. The database 112A may store the PSAP profiles generated by the network server 100.

Processor 114 might actually be multiple processors that receive instructions associated with the applications and process the instructions accordingly. Presentation component 116 includes the likes of a display and a speaker, as well as other components that can present information (such as a lamp (LED), or even lighted keyboards) associated with the outputs of applications or other components of the network server 100.

The network server 100 may store cell sector information and may generate profiles based on responses received from PSAPs within the cell sectors. The PSAP responses are generated in reply to test emergency services calls. The response confirms whether media formats supported by the wireless network are supported by the PSAPs. The response may also confirm whether mid-call renegotiation of media formats or codecs are permitted by the PSAP.

The communication interface of the network server 100 may be a radio 117 that facilitates communication with a wireless telecommunications network. Illustrative wireless telecommunications technologies include CDMA, GPRS, TDMA, GSM, WiMAX, LTE, UMTS, and the like. In some embodiments, radio 117 might also facilitate other types of wireless communications including Wi-Fi communications, Bluetooth™, Zigbee, or other near-field communication. In other embodiments, the communication interface of the network server 100 may be a wired line like Ethernet.

Input/output port 118 of network server 100 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into network server 100. Power supply 122 includes items such as batteries, fuel cells, or any other component that can act as a power source to power network server 100.

Accordingly, a network server 100 generates test emergency services calls or subsequent test emergency services calls and receives responses that indicate whether PSAPs support the media format and whether mid-call media renegotiation is supported by the PSAP. The network server 100 processes the PSAP responses to generate a profile. It will be understood and appreciated by those of ordinary skill in the art that the network server 100 shown in FIG. 1 is merely an example of one suitable network server 100 and is not intended to suggest any limitation as to the scope of use or functionality of the embodiments of the invention. Neither should the network server 100 be interpreted as having any dependency or requirement related to any single component or combination of components illustrated therein. The single unit depictions are meant for clarity, not to limit the scope of embodiments in any form.

In some embodiments, a network server on the wireless network generates test emergency services calls or subsequent test emergency services calls. The test emergency services calls are routed to one or more PSAPs based on the cell sectors identified in the test emergency services calls. The test emergency services calls may specify one or more media formats that are supported by the wireless network. The one or more mid-call services signals may be generated after the network server has established a session with the PSAP. The one or more mid-call services signals may request that the PSAP perform one or more mid-call media changes (renegotiation of format or codecs). The PSAP responses are processed and saved to the database in profiles that identify the media formats that are supported or unsupported by the responding PSAPs. The profile also stores an indication of the mid-call renegotiation capabilities of the PSAP.

Figure 2:
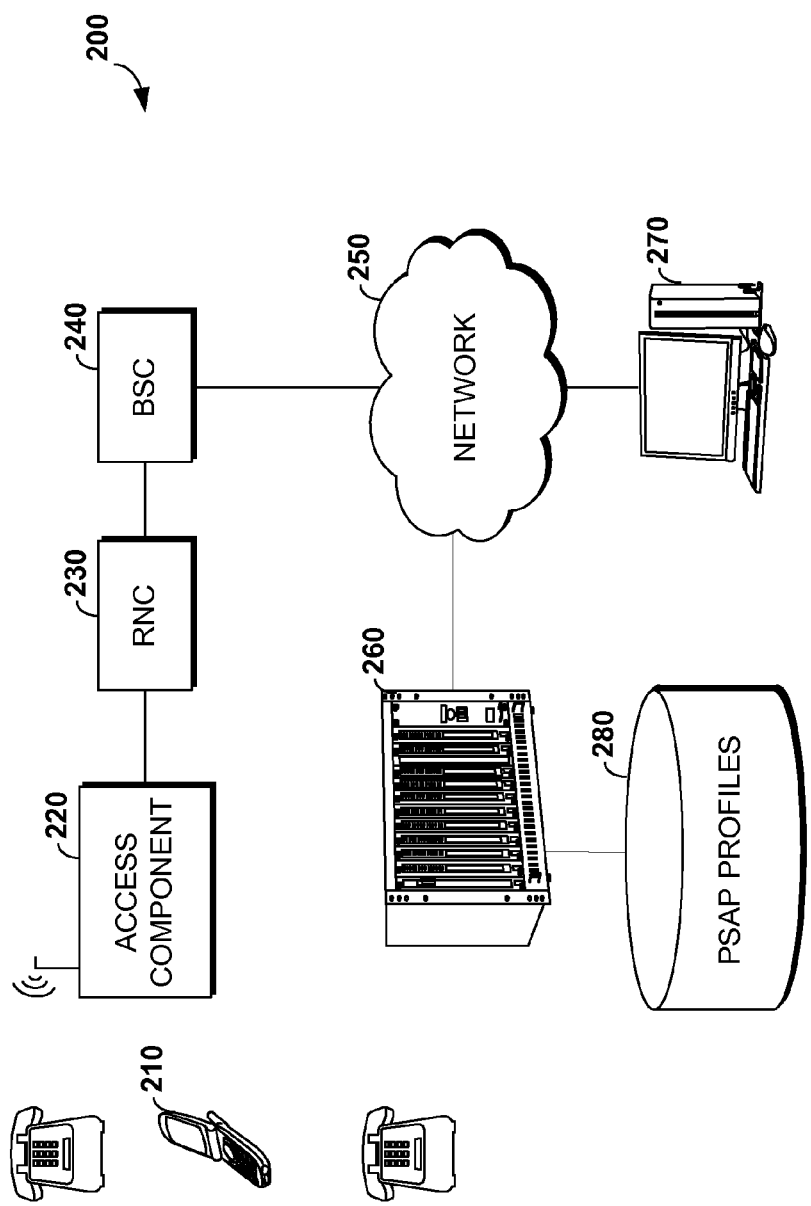
FIG. 2 depicts a network diagram of an exemplary communication system in accordance with embodiments of the invention.

FIG. 2 depicts a network diagram of an exemplary communication system in accordance with embodiments of the invention. Turning now to FIG. 2, an illustrative computing system 200 is provided and referenced generally by the numeral 200, which depicts an illustrative operating environment for determining whether media formats supported by the communication devices 210 are also supported by the PSAPs 270. The computing system 200 may include communication devices 210, access components 220, RNC 230, BSC 240, network 250, network server 260, PSAP 270, and profile database 280.

Communication devices 210 may be used for voice, data, or a combination of voice and data communication. The communication devices 210 may be wireless devices (phones, pagers, display screens, etc). The communication devices 210 may connect to network 250 to complete communication requests. The communication requests may include requests for emergency services. The requests may specify media formats or codecs for content transmission. The requests may also specify changes in media format or codec for established communication sessions. Communication devices 210 may communicate among themselves over a near-field channel in certain embodiments. Communication devices 210 may connect to BSC 240 or a third party via communication link. The BSC 240 or third party may facilitate communication to and among the communication devices 210. The communication devices 210 may also connect to the PSAP 270 via the BSC 240.

The access component 220 may be a wireless router. Generally, the access component 220 provides access to what some skilled artisans refer to as a wireless communications network 250. The access component 220 may be one or more of a base transceiver station (BTS) tower, a Wi-Fi router, and any other device that facilitates communication between communication device 210 and network 250. In one embodiment, the access component 220 includes both a Wi-Fi router and a BTS tower. In another embodiment, access component 220 is a BTS tower.

A RNC 230 performs various functions, such as managing radio channels, power control, load control, admission control, packet scheduling, handover control, macrodiversity, security functions, and mobility management. A BSC 240 and network server 260 are also shown in FIG. 2. The BSC 240 acts as the intelligence behind base transceiver stations (BTS) (not shown), and handles allocation of radio channels, receives statistics from the communication devices 210, generates emergency services calls when commanded, and controls handovers from one BTS to another BTS.

The network 250 connects the BSC 240 to the network server 260 and PSAP 270. The network 250 may be an IP network operating one or both of IPv4 and IPv6. The network 250 provides communication links that may be a short-range connection, a long-range connection, or a combination of both a short-range and a long-range wireless telecommunications connection. "Short" and "long" range connections do not refer to the spatial relation between two devices. Instead, short-range and long-range are different categories, or types, of connections (i.e., a primary connection and a secondary connection). A short-range connection may include a Wi-Fi connection to a device (e.g., wireless hotspot) that provides access to a wireless communications network, such as a WLAN connection using 802.11 protocol. A long-range connection may include a connection using one or more of CDMA, GPRS, GSM, TDMA, and 802.16. The network 250 routes the NG911 calls generated by the communication devices 210 to the appropriate PSAPs 270. The network 250 also routes the test emergency services calls and one or more mid-call services signals generated by the network server 260 to appropriate PSAPs 270. The PSAP responses to test emergency services calls and one or more mid-call services signals are transmitted to the network server 260 over the network 250. The PSAP responses to the NG911 calls are transmitted to the communication devices 220 over the network 250.

The network server 260 may be a switch that is configured to generate the test emergency services calls and the one or more mid-call services signals. The test emergency services calls and one or more mid-call services signals are transmitted to the PSAP 270. The network server 260 probes the PSAPs 270 with the test emergency services calls and one or more mid-call services signals. From the responses generated by the PSAPs 270, the network server 260 may determine which of the next generation 911 capabilities are supported. The network server 260 may also determine whether mid-call renegotiation is supported by the PSAPs. These test emergency services calls and one or more mid-call services signals are generated automatically, which reduces the manual effort required to test the PSAP 270 and eliminates costs and errors associated with manual testing. The network server 260 extracts the PSAP media format support information and identifiers from the responses and creates a profile for storage in the database 280.

The PSAP 270 is a platform that provides safety responses for a particular region. Over 6,000 PSAPs 270 may operate within the coverage area of the wireless network 250. The PSAPs 270 may have a disparity in technology deployment, advancement and upgrades, which increases the complexity of determining which PSAPs 270 support media formats available on the wireless network. To identify the capabilities of each PSAP 270, the network server 260 sends test emergency services calls to the PSAP 270. The test emergency services calls, in some embodiments, are sent to the loopback interface of the PSAP 270. In some embodiments, the network server 260 transmits one or more mid-call services signals to the PSAP once a session is established with the PSAP 270 to determine whether mid-call renegotiation is supported. In response to the test emergency services calls and one or more mid-call services signals, the PSAP 270 may respond the same way it would for a real next generation 911 call. The results of the test emergency services calls and one or more mid-call services signals are received by the network server 260, which builds a profile of the current PSAP media capabilities.

The profile database 280 stores the media capabilities for each PSAP 270 that responded to test emergency services calls. The profile database also stores an indication of whether mid-call renegotiation is supported by the PSAP. In some embodiments, multiple PSAPs 270 may respond to an emergency services call that has a combination of media types. The database 280 stores identifiers for the PSAPs 270, the media formats supported, and the media formats that are not supported. The database also stores an indication of whether a change in media format to a new media format or a change in codec for the media format are supported by the PSAPs 270. The database 280 may also store the location associated with the PSAP 270. The location may correspond to the cell sector identified in the test emergency services call or subsequent test emergency services calls. Accordingly, database 280 may store a carrier coverage map showing the location of the PSAP 270 and identifying the media format supported by each of illustrated PSAPs 270 and whether mid-call renegotiation is also supported.

Accordingly, the network server is configured to generate profiles for the PSAPs. The profiles are stored by the database and may include data about a type of emergency services requested (e.g., fire, ambulance, police); the PSAP identifier; the media formats supported and unsupported; and whether mid-call renegotiation is available for each to the supported media formats. In one embodiment, the media formats include phone calls, text messages, PTT, SMS, video chat, two way communication, one-way communication, etc.

The illustrated elements of computing system 200 are meant to be exemplary in nature, and the various lower-level details of the elements are not elaborated on so as to not obscure the embodiments of the invention. Clearly, some of the elements may be absent in some embodiments of the invention, and additional elements not shown may also be part of computing system 200. Attempting to show all of the various elements of computing system 200 would obscure certain novel aspects, and we will refrain from such elaboration at least for the sake of brevity.

A network server, in one embodiment, is configured to build a profile for each cell sector and PSAP within the coverage area of the wireless network. The network server selects a cell sector maintained by the wireless network provider. In turn, the network server generates test emergency services calls and mid-call services signals. The test emergency services calls are transmitted to a PSAP. The PSAP establishes a communication session with the network server. During the session, mid-call services signals are transmitted to the PSAP to determine mid-call capabilities. In response to the test emergency services calls and mid-call services signals, the PSAP provides responses that indicate whether the PSAP supports a media format identified in the test emergency services call and whether the PSAP supports mid-call renegotiation. The PSAP responses to the test emergency services calls and mid-call services signals are parsed by the network server to populate the database and build a profile for each PSAP. The PSAP profile stores, among other things, public safety answering platform (PSAP) mid-call capabilities for emergency services calls.

Figure 3:
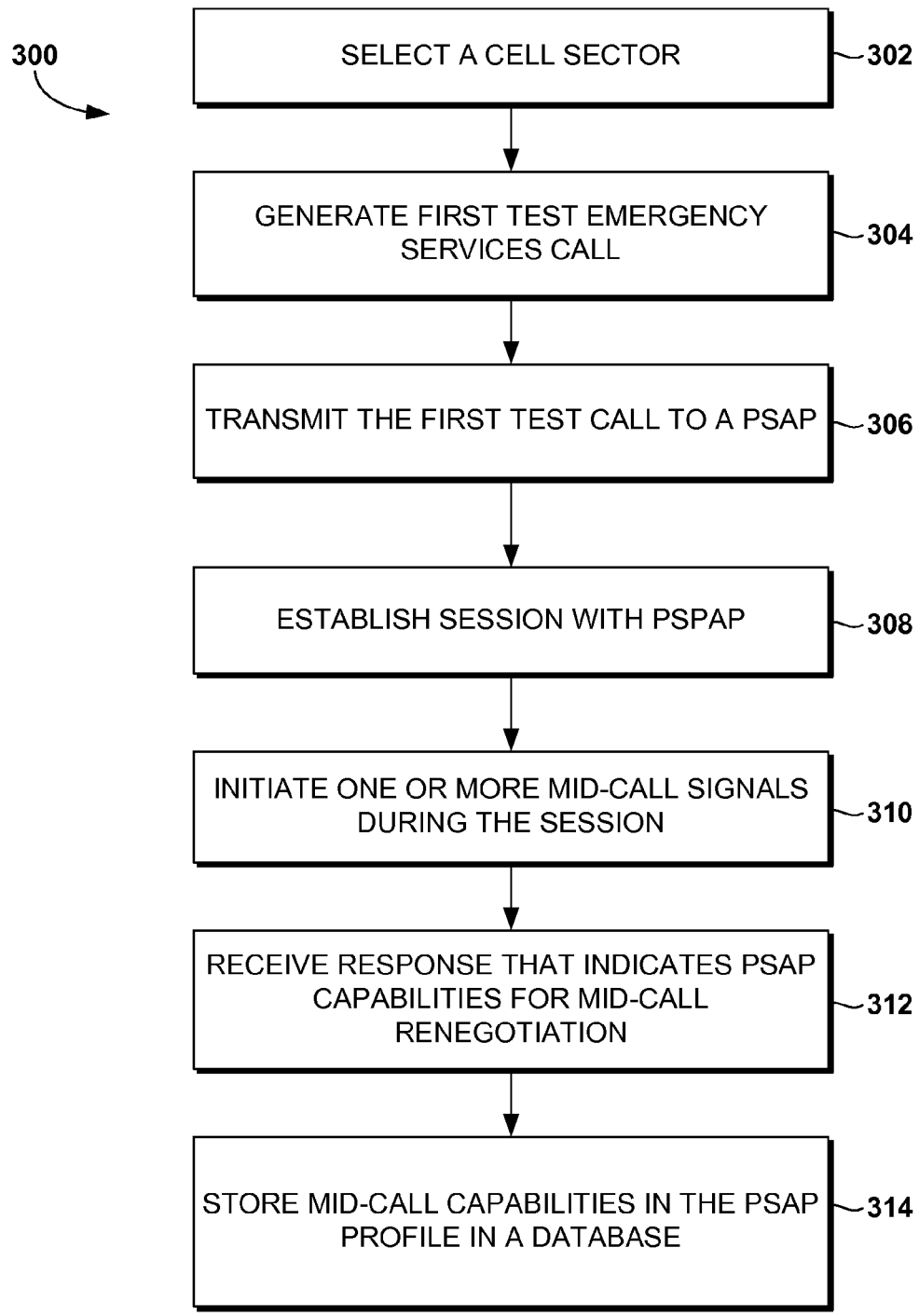
FIG. 3 depicts an exemplary logic diagram for generating a PSAP profile in accordance with embodiments of the invention.

FIG. 3 depicts an exemplary logic diagram for generating a PSAP profile in accordance with embodiments of the invention. Turning now to FIG. 3, in step 302, the network server selects a cell sector maintained by a wireless network provider. The network server, in step 304, generates a test emergency services call. Each cell sector maintained by the network provider is identified in a separate test emergency services call. The first test emergency services call, in at least one embodiment, is a session description protocol (SDP) message. In other embodiments, the first test emergency services call is a session initiation protocol (SIP) message. The first test emergency services call identifies at least one media format or codec that is supported by the network provider. The first test emergency services call, in other embodiments, may identify at least two media formats that are supported by the network provider, wherein the two media formats may be transmitted at the same time to the PSAP.

The first test emergency services call is routed to a PSAP, in step 306. The first test emergency services call is transmitted, in some embodiments, to a loopback interface of the PSAP. The first test emergency services call follows all of the next generation 9-1-1 routing, call handling, and media treatment except that it is never delivered to a PSAP dispatcher (public safety dispatcher that answers 911 calls).

The network server establishes a session with the PSAP, in step 308. The communication session may facilitate transmission of the media formats between the networks server and the PSAP. During the communication session with the PSAP, the network server may initiate one or more mid-call services signals that modify the media format or codec for the session established in response to the first test emergency services call, in step 310. The one or more mid-call services signals, in at least one embodiment, is a session description protocol (SDP) message. In other embodiments, the one or more mid-call services signals is a session initiation protocol (SIP) message. The one or more mid-call services signals identifies at least one change in media format or codec that was identified in the first test emergency services call. The one or more mid-call services signals, in other embodiments, may identify at least two changes in media formats or codecs that were identified in the first test emergency services call. The one or more mid-call services signals may also be transmitted to the loopback interface of the PSAP.

In step 312, the network server receives a response from the PSAP. The response may indicate whether the PSAP supports a media format identified in the first test emergency services call. The media formats include push to talk (PTT), text, video, voice, instant messaging, e-mail, two-way communication, and one-way communication. The response may also indicate whether mid-call renegotiation (e.g., changing from voice to video; or updating the video codec from a high resolution codec to a resource-sensitive low resolution codec) as requested in one or more mid-call services signals is supported by the PSAP. The network server extracts PSAP identifiers from the response.

A PSAP profile is created, in step 314, by the network server to store, among other things, the mid-call capabilities. The PSAP profile includes the PSAP identifiers and media support information for each cell sector covered by the PSAP. The network server stores a PSAP profile for each cell sector in a database. Accordingly, the results of the test emergency services calls and one or more mid-call services signals are parsed by the network server to build a profile of the current PSAP media capabilities and mid-call capabilities.

Accordingly, in response to the first test emergency services call and one or more mid-call services signals, a PSAP provides a response that indicates whether the PSAP supports the media format identified in the test emergency services call and whether the PSAP supports the mid-call renegotiation to the media format or media codec in the one or more mid-call services signals. The responses are parsed by a network server for storage in a PSAP profile.

In some embodiments, the network server executes an optimization algorithm to reduce the number of first test emergency services calls and one or more mid-call services signals generated. The optimization reduces the signaling and messaging required to determine the capabilities of the PSAPs. The optimizations include, among other things, extracting information from PSAP profiles to better determine which media formats or combinations should be included in a first test emergency services call or a subsequent test emergency services call.

Figure 4:
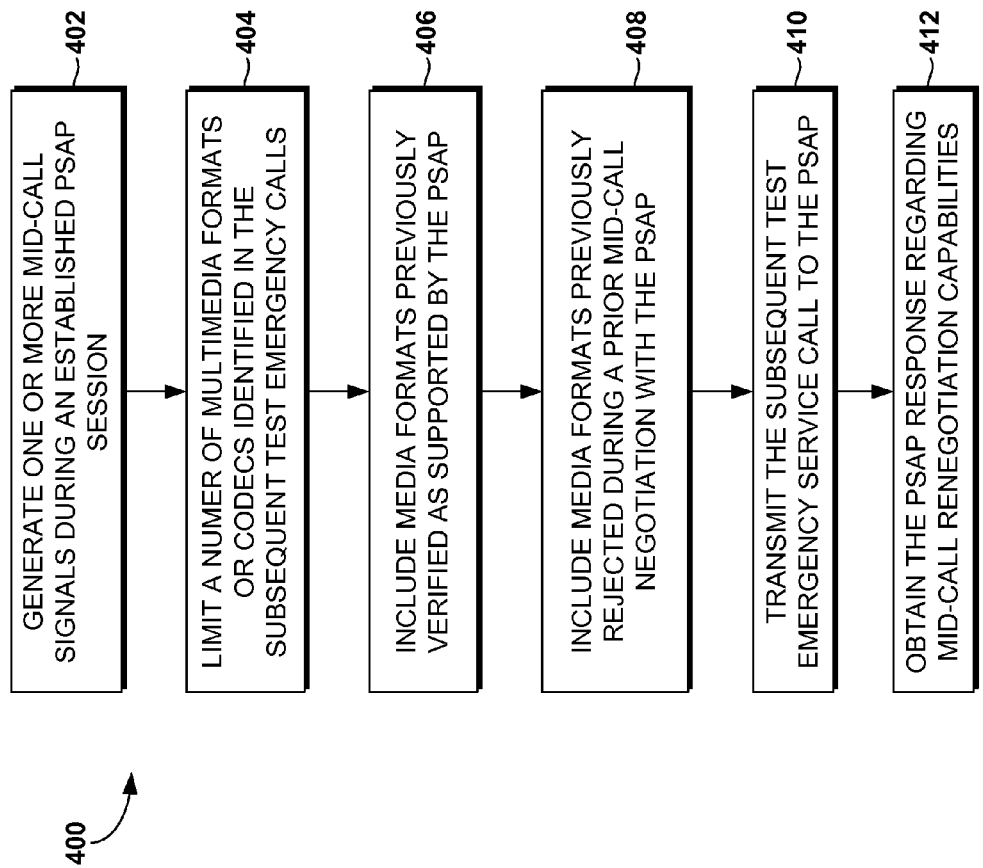
FIG. 4 depicts an exemplary logic diagram for providing a response to optimized test emergency services calls in accordance with embodiments of the invention.

FIG. 4 depicts an exemplary logic diagram for providing a response to optimized test emergency services calls in accordance with embodiments of the invention. Turning now to FIG. 4, in step 402, the network server generates one or more mid-call services signals during an established PSAP session.

The network server applies optimizations to the one or more mid-call services signals. The optimization reduces or limits a number of one or more mid-call services signals for the PSAP. The network server may limit a number of different multimedia formats or codecs available during a mid-call renegotiation, in step 404. In turn, the network server may generate one or more mid-call services signals that include media formats or media codecs that were previously verified as supported by the PSAP, in step 406. In step 408, the network server may generate one or more mid-call services signals for media formats or media codecs that were previously verified or rejected by the PSAP during a prior mid-call session renegotiation. The network server may, in an alternative embodiment, eliminate one or more mid-call services signals for media formats or media codecs that were previously verified as supported by the PSAP.

In step 410, the one or more mid-call services signals are transmitted by the network server to the PSAP. A response from the PSAP indicates whether mid-call renegotiation of the media formats or codecs are supported. The mid-call media negotiation results are stored in PSAP profiles. As explained above, the network server is configured to implement one or more of the optimizations to reduce signaling traffic related to test emergency services calls.

One optimization—that may be executed by the network server when determining which media types to include in one or more mid-call services signals—is electing media types and codecs that were not verified as being supported by a particular PSAP (cell or sector) during a previous test emergency services call.

Another optimization executed by the network server may be electing media types and codecs that were not verified as being supported by a particular PSAP (cell or sector) during previous mid-call services signals that attempted to determine mid-call capabilities for the media types of codecs.

Yet other optimizations executed by the network server include electing media types and codecs that were verified as being supported by the PSAP (cell or sector) during a previous test emergency services call but were not verified in previous more mid-call services signals that attempted to determine mid-call renegotiation capabilities for the media types or codecs.

Still other optimizations executed by the network server include eliminating from media types of codecs from the one or more mid-call services signals any media types or codecs (either alone or in combination) that were rejected by the PSAP (cell or sector) during a previous test emergency services call.

Further optimizations executed by the network server include electing media types and codecs that were verified as being supported by the PSAP (cell or sector) during a previous test emergency services call but were rejected by the previous mid-call services signals that attempted to determine mid-call renegotiation capabilities for the media types or codecs.

Additional optimizations executed by the network server include identifying reasonable predetermined combinations of media formats and codecs and imposing limits on the number of combinations that will be tested via the one or more mid-call services signals. The reasonable maximums may be based on typical 911 applications and use cases. For the number of media types or codecs that are added during a subsequent test emergency services calls, the overall and addition limit may be four (e.g. no more than four audio streams, or any combination to media types and codecs).

The combinations may be limited based on the existing information in the PSAP profile. If a medium is identified as unsupported in the PSAP profile, the combination having the unsupported is not included in the one or more mid-call services signals. A combination of picture and video in first test emergency services calls may, as part of the optimization, prevent the network server from initiating a change in media formats to voice, picture, or a combination of voice and picture the one or more mid-call services signals. The network server, however, may allow changes within the codec (via the one or more mid-call services signals) due to network congestion, where the change moves the media format to a compressed version or low-resolution version of the media format.

The network server that generates the optimized one or more mid-call services signals may reduce call signaling and congestion on the wireless network. For example, the network server may implement an optimization that checks mid-call support of media types that have been verified. If media 1 and 2 are verified but media 3 and 4 are not, the network server may generate a first test call for media 3 or 4, and generate one or more mid-call services signals for media 1 and 2. Thus, the network server reduces call signaling by not generating additional test emergency calls for unverified media (media 3 or 4).

Priorities (1-10) of media formats or codecs may be selected by the network server based on whether verification occurred for the media format or codec. The network server may assign low priorities to media formats or codecs that are not verified during mid-call renegotiation. A low priority (1) media format is less likely to be included in the one or more mid-call services signals that determine whether media renegotiation is supported. On the hand, a high priority (10) media format is very likely to be included in the one or more mid-call services signals.

The one or more mid-call services signals may negotiate media capabilities by dropping, adding, or modifying the media format or codec of the existing session. The PSAP response may indicate whether the PSAP accepts the change and provide notice of the PSAP reconfiguration (e.g., changing from voice to text). For instance, at the scene of an accident a witness may take a picture. The witness may call 911. If the PSAP that answers the call supports NG911, the witness may submit the picture during the voice session with the PSAP. If the PSAP does not support a format of the picture, the PSAP may either convert the picture or provide the user with a list of acceptable formats and codecs.

In some embodiments, the test emergency services call and one or more mid-call services signals are SDP messages that are sent to the PSAP. The PSAP generates one or more PSAP responses. In an embodiment, the PSAP generates a response to each of the test emergency services calls and one or more mid-call services signals.

Figure 5:
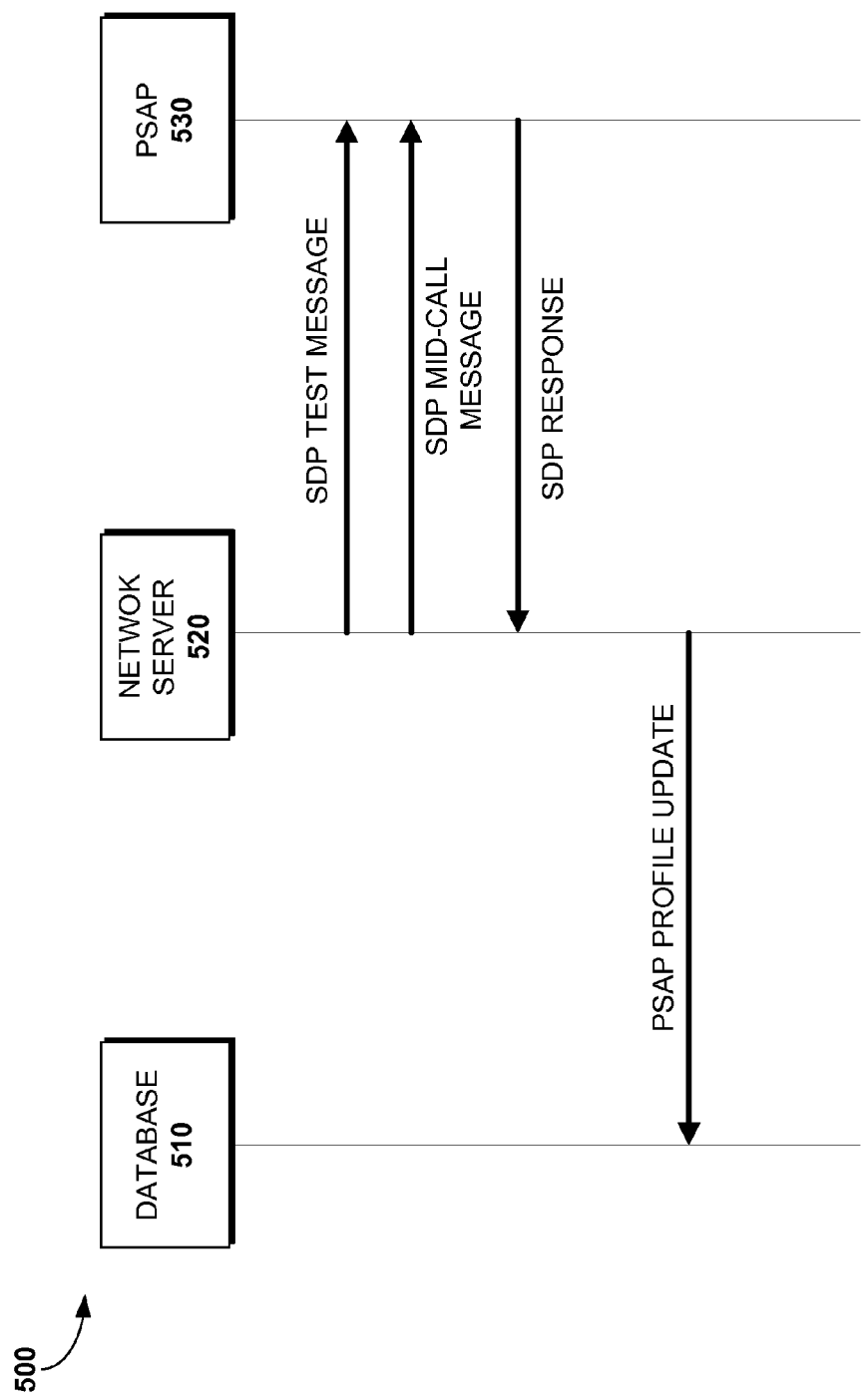
FIG. 5 depicts an exemplary communication flow diagram receiving a response to the test emergency services calls in accordance with embodiments of the invention.

FIG. 5 depicts an exemplary communication flow diagram receiving a response to the test emergency services call and subsequent test emergency services call in accordance with embodiments of the invention. A database 510, network server 520, and PSAP 530 exchange communication messages. The network server 520 generates a first SDP test message. The first SDP test message is a test emergency services call that identifies the cell sector and media formats. The first SDP test message is routed to a PSAP 530 based on the cell sector.

The PSAP 530 establishes a session with the network server 520 in response to the first SDP message. During the session, the network server 520 generates a subsequent SDP test message that corresponds to the one or more mid-call services signals. The subsequent SDP test message may attempt to renegotiate media formats or codecs that correspond the session. The PSAP 530 receives the first SDP test message and the subsequent SDP test message.

The PSAP 530 provides a SDP response. The SDP response indicates whether the media formats identified in the first SDP test message are supported by the PSAP 530. Additionally, the SDP response indicates whether the media renegotiations identified in the subsequent SDP test message are supported by the PSAP 530. In one embodiment, the SDP response to the first SDP test message and the SDP response to the subsequent SDP test message are combined in one response. A separate SDP response, in other embodiments, is provided during both initial call setup and mid-call renegotiation.

The network server 520 receives the SDP response and generates a profile update message that is transmitted to the database 510. The profile update message may include an identifier of the PSAP 530 and the media formats that are supported or not supported as indicated in the SDP response. The profile may also include an indication of whether mid-call renegotiation is allowed by the PSAP.

In summary, embodiments of the invention configure network servers to probe PSAPs in coverage areas supported by the wireless network providers. The network servers utilize SDP or SIP messages to probe media support or mid-call renegotiation support at the PSAP. The SDP or SIP message describes media support by the wireless network and the cell sectors of interest. These messages are routed to the PSAP, which provides an OK response or Error response. These responses are processed by the network server to create and update PSAP profiles for the wireless network.

In yet another embodiment, the PSAP provides an indication of supported media formats in response to the test emergency services calls. As explained above, the PSAP may obtain a test emergency services call at the loopback interface. The PSAP, in turn, extracts the media formats requested in the test emergency services call. The PSAP may identify current capabilities of the PSAP and determine whether a match exists between the extracted media formats and the current capabilities. When a match is found, the PSAP generates a response that includes the matching capabilities. The PSAP transmits the response to the network server. The PSAP response may include an indication of whether mid-call renegotiation of media formats or codecs is supported. Thus, the PSAP is configured to respond to the test emergency services and subsequent test emergency services calls without disrupting real emergency services calls that should be routed to a dispatcher. The PSAP support of media format or support for mid-call renegotiation are determined without emergency services dispatcher input.

In one embodiment, a database is updated with a PSAP profile based on a test emergency services call or subsequent test emergency services call. The test emergency services call may be a SDP message generated by a network server of the wireless network. The SDP message is routed to the appropriate PSAP based on the cell sector identified in the test emergency services call. The PSAP generates a SDP response that indicates whether the PSAP supports one or more media formats identified in the SDP message. The SDP response is received at the network server, which updates the PSAP profile. The SDP response may also be configured by the PSAP to specify whether mid-call renegotiations to one or more specified media formats or codecs are permitted.

Real Next Generation 911 calls are not used to create or update the PSAP profile because real Next Generation 911 calls may burden dispatchers and may not include the necessary diversity of media format usage. Importantly, the distribution of real emergency calls cannot be guaranteed to use or try all the media types that the wireless network supports through all of the cell sectors. To obtain a sample size of any significance would take a very long period of time (possibly decades). The automatic test emergency services calls may include all the media formats. And the PSAP provides response to the test emergency services calls in a much shorter period of time.

In certain embodiments, the one or more mid-call services signals request addition of other media types that may not be supported by the PSAP based on the initial routing needs of the networks server. For instance, a selected PSAP may only support calls with certain media capabilities that are reserved at the beginning of a call and may not support moving a call to another PSAP with the altered media capabilities requested during a call.

In some instances, a network server may execute an optimization to limit the subsequent test emergency calls that are initiated. This may reduce the amount of network resources required to support testing, reduce the total aggregate time the resources are in use by testing, and reduce the number of combinations of mid-call media types and actions (add or modify a media type through a SIP re-INVITE) that need to be tested by the network server. In some embodiments, the optimizations may be applied due to load limits associated with a PSAP (a PSAP may be busy handling real 911 or NG911 calls). In some embodiments, the one or more mid-call services signals may include several mid-call test combinations on one call as opposed to the first test emergency services call, which may only have one test combination per test call. Accordingly, the results of the mid-call test combination are recorded by a database to develop a PSAP profile per cell or sector.

Accordingly, a network server may test initial media and mid-call media capabilities. These capability may be tested in one or more test emergency service calls. For instance, a network server may transmit a SIP test emergency service call with set of media to a PSAP. The PSAP accepts the test emergency service call and may respond appropriately (e.g., with an acknowledgement signal). In turn, the network server may transmit a SIP re-INVITE (during the same call or session) requesting a change the media. The PSAP accepts the SIP re-INVITE having the changed media identified and responds with an indication of whether it supports mid-call renegotiation of media. The network server receives the PSAP response and closes the session for test emergency services call.

In some embodiments, the network server may test the Initial media and mid-call media capabilities tested in separate test emergency services calls. For instance, network server may transmit a SIP test message with set of media to the PSAP. The PSAP accepts test call and responds appropriately (e.g. generates a SIP response identifying whether the set of media is supported). The network server obtains the PSAP response and may close the session associated with the SIP test message. After receiving the PSAP response, the network server may transmit a subsequent SIP test message with the same media set as the first message to the PSAP. The PSAP accepts the subsequent SIP test message and responds appropriately (e.g., and acknowledgement). Upon receiving the acknowledgment, the network server may transmit a SIP re-INVITE (during a session associated with the subsequent SIP test message) changing the media. The PSAP accepts the SIP re-INVITE for changed media and generates a response that indicates whether mid-call renegotiation to the media is permitted. The network server receives the PSAP response and may close the session associated with the subsequent SIP test message.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The technology claimed is:

1. Non-transitory computer-readable media having computer-executable instructions embodied thereon that, when executed, perform a method to identify public safety answering platform (PSAP) mid-call capabilities for emergency services calls, the method comprising:
   selecting a cell sector maintained by a network provider;
   generating a first test emergency services call identifying at least one media format or codec;
   transmitting the first test emergency services call to a PSAP;
   establishing a communication session with the PSAP;
   during the communication session with the PSAP, initiating one or more mid-call services signals that modify the media format or codec for the session established in response to the first test emergency services call; and
   receiving one or more responses from the PSAP that indicates whether the PSAP supports the media format identified in the test emergency services call and whether the PSAP supports the mid-call renegotiation to the media format or media codec in the one or more mid-call services signals.

2. The media of claim 1, wherein each cell sector maintained by the network provider is identified in a separate first test emergency services call.

3. The media of claim 1, wherein the first test emergency services call and the one or more mid-call services signals are session description protocol (SDP) messages.

4. The media of claim 1, wherein the first test emergency services call and the one or more mid-call services signals are session initiation protocol (SIP) messages.

5. The media of claim 1, wherein the first test emergency services call identifies at least one media format or codec that is supported by the network provider.

6. The media of claim 1, wherein the first test emergency services call or the one or more mid-call services signals identifies at least two media formats that are supported by the network provider, wherein the two media formats may be transmitted at the same time to the PSAP.

7. The media of claim 1, wherein the media formats include push to talk (PTT), text, video, voice, instant messaging, email, two-way communication, and one-way communication.

8. The media of claim 1, wherein the first test emergency services call and the one or more mid-call services signals are transmitted to a loopback interface of the PSAP.

9. The media of claim 1, further comprising: extracting PSAP identifiers from the response; and creating a PSAP profile that includes the identifiers and media support information for each cell sector.

10. The media of claim 9, further comprising: storing the PSAP profile for each cell sector in a database.

11. The media of claim 1, further comprising applying an optimization to the subsequent test emergency services calls, wherein the optimization may reduce or limit a number of subsequent test emergency services calls for the PSAP.

12. The media of claim 11, wherein the optimization is one of the following:
   limiting a number of different multimedia formats or codecs available during a mid-call renegotiation;
   generating subsequent test emergency services calls for media formats or media codecs that were previously verified as supported by the PSAP;
   generating subsequent test emergency services calls for media formats or media codecs that were previously verified or rejected by the PSAP during a prior mid-call session renegotiation; or
   eliminating subsequent test emergency services calls for media formats or media codecs that were previously verified as supported by the PSAP.

13. Non-transitory computer-readable media having computer-executable instructions embodied thereon that, when executed by a public safety answering platform, perform a method to generate a response to a mid-call renegotiation of multimedia formats or multimedia codecs received from a network server, the method comprising:
   receiving a first test emergency services call, at the PSAP, identifying one or more multimedia types and multimedia codecs;
   establishing a communication session with the network server that generated the first test emergency services call;
   during the communication session with the network server, receiving one or more mid-call services signals that request modification of the media format or codec for the session established in response to the first test emergency services call;
   extracting multimedia formats or codecs requested in the test emergency services call and the one or more mid-call services signals;
   identifying current capabilities of the PSAP;
   determining whether any of the current capabilities match the extracted multimedia formats or codecs;
   generating a response that includes the matching capabilities; and transmitting the response to the network server.

14. The media of claim 13, wherein the first test emergency services call and the one or more mid-call services signals are SDP messages.

15. The media of claim 13, wherein the response is a SDP message.

16. The media of claim 13, wherein the response includes an identifier for the PSAP.

17. A communication system for building a public safety answering platform (PSAP) profile, the system comprising:
   a network server configured to perform the following:
      select a cell sector maintained by a network provider, generate a first test emergency services call identifying one or more multimedia formats or codecs; transmit the test emergency services call to a PSAP; establish a session with the PSAP in response to first test emergency services call; initiate, during the session, one or more mid-call services signals that modify the media format or codec for the session established in response to first test emergency services; and receive one or more responses from the PSAP, wherein the responses indicate whether the PSAP supports the media format identified in the test emergency services call and whether the PSAP supports mid-call renegotiation to the media format or media codec in the one or more mid-call services signals.

18. The system of claim 17, wherein the PSAP executes the following: obtain the test emergency services call, extract media formats and codecs requested in the test emergency services call; obtain the one or more mid-call services signals, extract media formats and codecs requested in the one or more mid-call services signals; identify current capabilities, determine whether any of the current capabilities match the extracted multimedia formats and codecs, and generate the response that includes the matching capabilities; and transmit the response to the network server.

19. The system of claim 17, further comprising: a database configured to store a PSAP identifier and corresponding media formats and codecs identified in the response generated by the PSAP and the media formats include push to talk (PTT), text, video, voice, instant messaging, e-mail, two-way communication, and one-way communication.

20. The system of claim 18, wherein the test emergency services call is transmitted to a loopback interface of the PSAP and the PSAP response is a SDP message.

* * * * *